(12) United States Patent
Glymph

(10) Patent No.: US 7,220,126 B2
(45) Date of Patent: May 22, 2007

(54) EDUCATIONAL MATHEMATICS GAME

(76) Inventor: Ronald C. Glymph, 6695 Orange Ave., #D, Long Beach, CA (US) 90805

(*) Notice: Subject to any disclaimer, the term of this patent is extended or adjusted under 35 U.S.C. 154(b) by 122 days.

(21) Appl. No.: 11/182,429

(22) Filed: Jul. 16, 2005

(65) Prior Publication Data

US 2006/0024648 A1 Feb. 2, 2006

Related U.S. Application Data

(60) Provisional application No. 60/589,024, filed on Jul. 19, 2004.

(51) Int. Cl.
*G09B 19/02* (2006.01)
(52) U.S. Cl. ........................... 434/191; 434/129
(58) Field of Classification Search ................ 434/128, 434/129, 188, 191, 193, 196, 207, 208, 209
See application file for complete search history.

(56) References Cited

U.S. PATENT DOCUMENTS

| | | | | |
|---|---|---|---|---|
| 3,314,168 A | * | 4/1967 | Heckman | 434/208 |
| 4,114,290 A | * | 9/1978 | Cooper | 434/200 |
| 4,379,700 A | * | 4/1983 | Pollock | 434/208 |
| 4,452,588 A | * | 6/1984 | Smith | 434/207 |
| 5,176,381 A | * | 1/1993 | Winters | 273/146 |
| 5,679,002 A | * | 10/1997 | Scelzo | 434/196 |
| 5,688,126 A | * | 11/1997 | Merritt | 434/128 |
| 5,868,393 A | * | 2/1999 | Williams | 273/299 |
| 6,065,970 A | * | 5/2000 | Elliott | 434/209 |
| 6,116,603 A | * | 9/2000 | Huang | 273/269 |
| 6,648,648 B1 | * | 11/2003 | O'Connell | 434/188 |
| 6,676,414 B1 | * | 1/2004 | MacHendrie et al. | 434/201 |
| 6,811,402 B1 | * | 11/2004 | Ritchie | 434/191 |
| 2002/0142272 A1 | * | 10/2002 | Greenberg | 434/191 |
| 2003/0031990 A1 | * | 2/2003 | Venegas, Jr. | 434/188 |

* cited by examiner

*Primary Examiner*—Kurt Fernstrom
(74) *Attorney, Agent, or Firm*—Edward R. Roberts

(57) ABSTRACT

There is shown card game apparatus and method of play for use in educating children in basic mathematical concepts, the apparatus including a six-sided mathematical function indicator, such as a die, used in combination with two sets of cards, the function generator containing notation on a side indicating a different arithmetic operation such as addition, subtraction, multiplication and division, and on a fifth and sixth side game playing instructions. The first set of cards, some dealt to the players, include selected sets of cards each set numbered 1-10. The second set of cards consists of ten cards numbered 1-10 that are stacked to provide unit numbers used in the mathematical process indicated by the function indicator. In playing the game a player determines a problem to be solved by combining a card from the first and second sets and the mathematical function to be utilized, and then uses cards from his hand to demonstrate solution of the problem, the object of the game to rid ones hand of all cards.

12 Claims, 2 Drawing Sheets

EDUCATIONAL MATHEMATICS GAME

CLAIM FOR BENEFIT TO EARLIER FILING DATE

This application claims the benefit of U.S. Provisional Application No. 60/589,024 filed on Jul. 19, 2004 and entitled "Educational Mathematics Game". This utility application has the same inventor, subject matter and title as the said Provisional Application.

BACKGROUND

The background of the invention will be discussed in two parts.

1. Field of the Invention

The present invention relates to educational games for teaching basic mathematics and particularly to apparatus and method for playing a game including a mathematical function indicator in combination with a first set of cards some of which are dealt to the players, and a second set of stacked cards each having a unit number used in the process indicated by the mathematical function indicator.

2. Description of the Related Art

Various mathematics related games have been created for educational and amusement purposes. One example of such a game is disclosed in U.S. Pat. No. 5,102,339 to Parriera wherein there is shown and described a mathematical board game including circuitous paths with mathematical operation symbols, questions and a die which determines advancement of game tokens. Another example is disclosed in U.S. Pat. No. 5,679,002 to Scelzo wherein there is shown and described a fractional-arithmetic-teaching game and method for playing. Another example is disclosed in U.S. Pat. No. 6,308,955 to Slatter wherein there is shown and described a mathematical board game that teaches the four basic formats of mathematics. Another example is disclosed in U.S. Pat. No. 5,782,471 to Bautista wherein there is shown and described a board game apparatus and method of play for teaching basic arithmetic and mathematical operations to small children.

SUMMARY

The present invention consists of a game apparatus and method that is capable of teaching children many basic concepts involving integers. The game apparatus includes a mathematical process, or function indicator, such as a die or bar, used in combination with two sets of cards. The six-sided die contains notation indicating a different arithmetic operation; thus, a first side indicates addition, a second subtraction, a third multiplication, a fourth division, and a fifth and sixth, each having "Player's Choice, Lose Two Cards", or a similar instruction. A first set of cards, some of which are dealt to the players (player's cards), may include for instance ten each of cards numbered 1-10 for a total of 100 cards. The second set of cards (stacked cards) consists of ten cards total, numbered 1-10, that are stacked to provide unit numbers used in the process indicated by the indicating function indicator. The second set of cards is distinguished from the second set in some manner, such as color.

As described more fully below, the game apparatus teaches mathematical concepts at various levels of proficiency. Thus, the present invention provides an enjoyable and educational game for students at various stages of learning while providing the teacher with a multi-purpose teaching tool.

Accordingly, it is an object of the present invention to provide an enjoyable and improved educational game apparatus that provides basic mathematical training for a range of elementary instructional levels. Other objects and features of the present invention will become apparent from the following detailed description considered in connection with the accompanying drawings. It is to be understood, however, that the drawings, wherein similar reference characters denote similar elements throughout the several views, are designed as an illustration only and not as a definition of the limits of the invention.

DRAWINGS

DESCRIPTION

Figure 1:
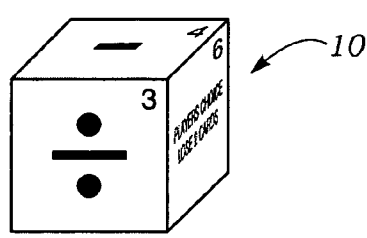
FIG. 1 is a perspective view of a first embodiment of the mathematics function indicator in accordance with the invention.
Figure 2:
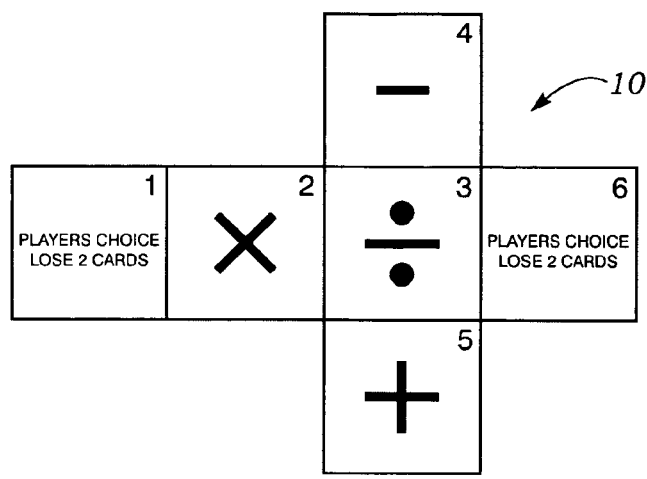
FIG. 2 is a plan view of the die of FIG. 1 showing the various functions and instructions thereon.

Referring now to the drawings, FIG. 1 illustrates in perspective view, a preferred embodiment of the mathematics function indicator in accordance with the invention. In this embodiment the mathematics function indicator is in the form of a common six-sided die, generally indicated 10. FIG. 2 illustrates, in plan view, the die 10 of FIG. 1. As seen, each side of the die contains notation indicating a different arithmetic operation; a first side indicating division, a second subtraction, a third multiplication, a fourth addition, and a fifth and sixth, each having instructions such as "Player's Choice, Lose Two Cards". It is understood that the player's choice option could have different instructions, however, if this notation comes up the player follows the instruction indicated and as will be explained, passes the die 10 to the next player in rotation. The faces of the die are numbered 1-6 in sequence and are used in selecting the sequence of players as will be further explained.

Figure 3:
FIG. 3 is a front view of the "player's" set of cards illustrating words, numbers, and number indicating indicia on the cards.

FIG. 3 is a front view of two cards of the "player's" set of cards, generally designated 20, illustrating words, numbers, and number indicating indicia on the cards. By way of example, card 21 has the number "2" thereon and card 22 has the numeral "9" thereon. In addition to its respective numeral, each card includes the respective numeral spelled out and a number of dots corresponding to the numeral. Although the spelling of the numeral is shown in English is understood that there can be included additional spelling of the numeral in a different language, or even in several different languages. Additionally, even though number indicating indicia in the form of dots are shown, other indicia can be used. As will be further explained some of these cards are dealt to the players (player's cards). The set may be varied: for instance it may include ten each of cards numbered 1-10 for a total of 100 cards, or five each of cards numbered 1-10 for a total of 50 cards.

Figure 4:
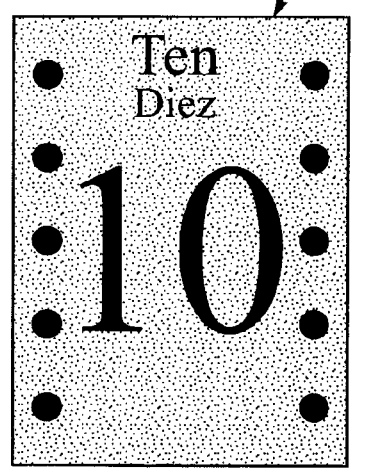
FIG. 4 is a front view of the "stacked" set of cards illustrating words, numbers, and number indicating indicia on the cards.

FIG. 4 is a front view of a card, generally designated 30, illustrating words, numbers, and number indicating indicia on the cards. This set of cards will be distinguished from cards 20 by being referred to as the "blue" cards and can in fact be colored blue, or they can be distinguished in some other manner. By way of example blue card 30 has the number "10" thereon. There are 10 cards in this set, numbered 1-10. As was the case with cards 21 and 22, each card in this blue set includes its respective numeral spelled out and a number of dots corresponding to the numeral. Again, although the spelling of the numeral is shown in English is understood that there can be included additional spelling of the numeral in a different language, or even in several different languages. Additionally, even though number indicating indicia in the form of dots are shown, other indicia can be used to indicate the number. As will be further explained these blue cards are stacked face up, with the number showing, to be used in combination with die 10 and cards in the "player's" set.

Figure 5:
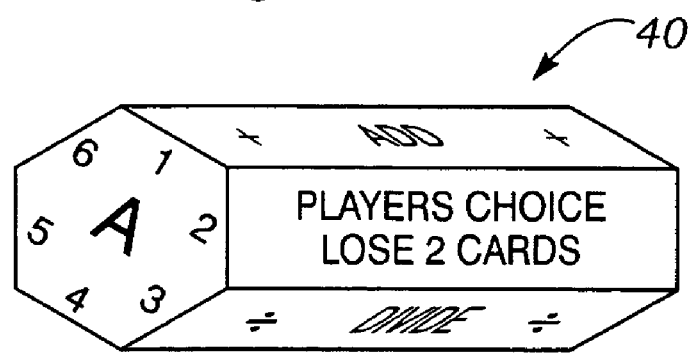
FIG. 5 is a perspective view of a second embodiment of the mathematics function indicator in accordance with the invention.
Figure 6:
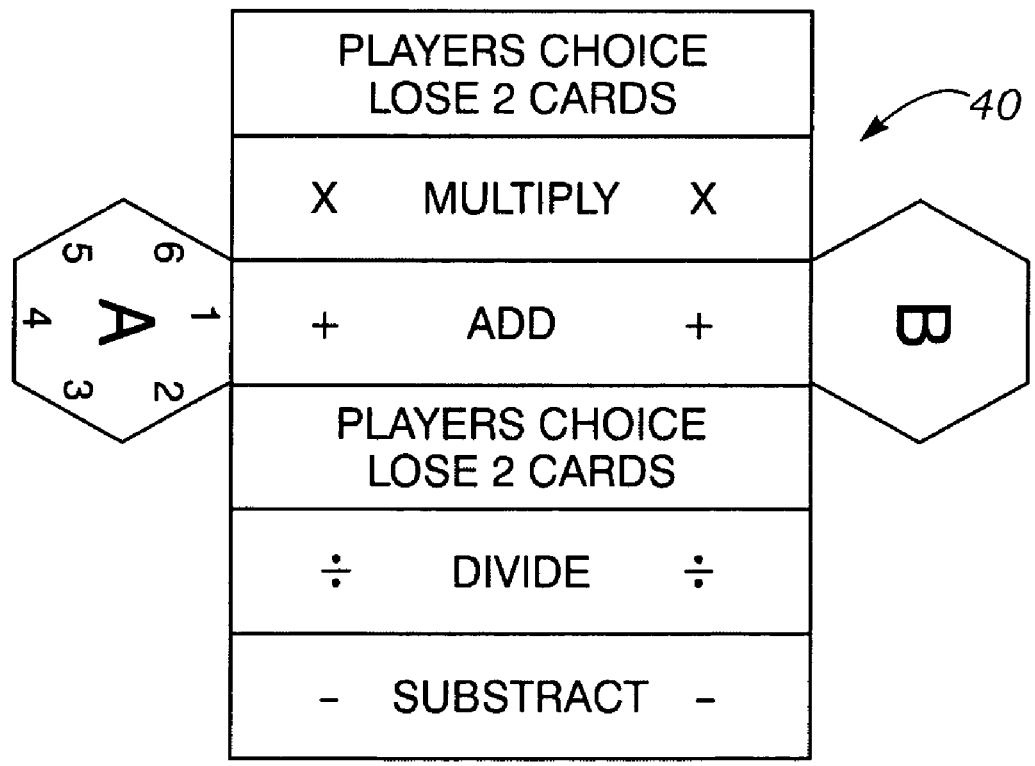
FIG. 6 is a plan view of the mathematics function indicator of FIG. 5 showing the various functions and instructions thereon.

The mathematics function indicator of the invention may take various forms. For instance, FIG. 5, in perspective view, illustrates an alternate embodiment, generally designated 40, of the mathematics function indicator in accordance with the invention. In this embodiment the function indicator 40 is in the form of a longitudinally extending six-sided bar with each side containing notation indicating a different arithmetic operation as was the case with the die 10, that is, a first side indicating division, a second subtraction, a third multiplication, a fourth addition, and a fifth and sixth, each having instructions such as "Player's Choice, Lose Two Cards" or "Player's Choice, Lose One Card". Bar 40 has a hexagonal cross section and is capped on each end. As shown in the drawings one end has the numbers 1-6 used in selecting the sequence of players as will be described, however, both ends could be left blank with the numbers appearing on the surfaces of the indicator. As will be explained, in playing the game function indicator bar 40 is rolled in the same manner as die 10. FIG. 6 illustrates, in laid out, or plan view, the alternate embodiment 40 of FIG. 5.

The game of the invention is begun by dealing to each player nine cards from the "player's" set of cards 20, the remainder of the deck stacked in the center, face down, to be drawn from later. The set of blue cards 30 is then stacked in the center, face up. The object of the game is for a player to rid his or her hand of all cards. Each player then rolls the selected mathematics function indicator and from the numbers indicated the order of play is determined. If more than one player rolls the same number they roll again until the sequence is determined.

The first player, for instance the highest roller, throws the function indicator, die 10 or bar 40, to determine the math function to be used, that is, addition, subtraction, multiplication, or division. If the "Players Choice" option comes up the player follows the instruction indicated, which generally results in a gain or loss in the number of cards in the players hand, and then passes the function indicator to the next player in rotation. If one of the math functions comes up, for example addition as indicated by the "+" symbol, the player takes a numbered card from his hand and places it face up with the number showing, such as for instance the number "9". This number "9" and the number on the face up blue card, such as for instance the number "3", are added to result in the number "12". The next player in rotation must then use the cards 20 in his/her hand to get the answer "12", that is 6 plus 6, or by laying down (pairing) two cards 30, one having a number "1" and the other having a number "2". No more than two cards can be used for this solution. If a player does not have numbered cards to make up the answer, he/she must take a card from the players set 20, roll the function indicator and place a card face up from his hand, and then pass to the next player. The face up blue card is placed on the bottom of the deck to thus reveal a different face up card for the next player.

If another mathematical function other that addition (+) comes up, the player likewise plays cards from his/her hand, which in combination with the face up blue card is used to establish an answer or objective number for the next player in rotation. For instance, if the mathematical function is multiplication (×), the blue card number is "3" and the card laid down has the number "9", the answer or objective number is "27". Thus, the next player in rotation must either lay down multiple cards with numbers such when multiplied equal "27", i.e. three cards with the number "3", or pairing two cards having a number "2" and a number "7". Play likewise then continues for the other mathematics functions until a player is out of cards.

There has been shown and described card game apparatus and the method of using the same that teaches foundational mathematics skills. Although the apparatus and method are described in detail, it is to be understood that modifications may be made to the invention by others skilled in the art that nevertheless fall within the scope of this invention.

What is claimed is:

1. A math-teaching game which enables player students while manipulating their game-pieces to gain an understanding of the basic concepts involving integers, comprising:
   a multi-sided function indicator having indicia located on sides thereon for denoting different game playing instructions and mathematical functions on a side, said function indicator configured for randomly presenting one side up when thrown in the manner of a die;
   a first set of playing cards including a plurality of sub-sets each sub-set having a plurality of cards each numbered 1-10;
   a second set of playing cards consisting of ten cards numbered 1-10; and
   whereupon with the rolling of said function indicator there is indicated one of said mathematical functions such that when combined with a card each from said first set of playing cards and said second set of playing cards a player is required to solve a thus designated mathematical problem by laying down cards from his hand, the object of the game being to rid his hand of all cards.

2. The math-teaching game of claim 1 wherein said function indicator is six-sided with four sides having indicia denoting different mathematical functions that are taken from the group consisting of addition, subtraction, multiplication and division, and with the other two sides having different game playing instructions thereon.

3. The math-teaching game of claim 2 wherein the numbered cards of said second set of playing cards include spelling of the numeral and numeral indicating indicia.

4. The math-teaching game of claim 2 wherein said function indicator is a six-sided die.

5. The math-teaching game of claim 2 wherein said function indicator is a longitudinally elongated hexagonal bar.

6. The math-teaching game of claim 2 wherein said game playing instructions include player options.

7. The math-teaching game of claim 3 wherein said second set of playing cards is visually distinguishable from said first set.

8. A math-teaching game which enables player students while manipulating their game-pieces to gain an understanding of the basic concepts involving integers, comprising:
   a six-sided function indicator having indicia located on two sides thereon for denoting different game playing instructions and four sides having indicia denoting different mathematical functions that are taken from the group consisting of addition, subtraction, multiplication and division, said function indicator configured for randomly presenting one side up when thrown in the manner of a die;
   a first set of playing cards including a plurality of sub-sets, each sub-set having a plurality of cards each numbered 1-10, from which cards are dealt to each player;
   a second set of playing cards placed face up between said players consisting of ten cards numbered 1-10, said numbered cards each including spelling of the numeral and numeral indicating indicia; and
   whereupon with the rolling of said function indicator there is thus indicated a mathematics function such that when combined with a card each from said first set of playing cards and said second set of playing cards a player is required to solve a designated mathematical problem by laying down cards from his hand, the object of the game being to rid his hand of all cards.

9. The math-teaching game of claim 8 wherein said function indicator is taken from the group consisting of a die and a longitudinally elongated hexagonal bar.

10. A method of playing an educational game for teaching mathematics comprising the following steps:
    providing a first set of playing cards including a plurality of sub-sets each sub-set having a plurality of cards each numbered 1-10;
    providing a second set of playing cards consisting of ten cards numbered 1-10;
    providing a multi-sided function indicator having indicia located on selected sides thereof for denoting different game playing instructions and mathematical functions, said function indicator configured for randomly presenting one side up when rolled in the manner of a die;
    dealing to each player nine cards from said first set of playing cards, the remainder of the said first set stacked in the center of said players, face down;
    placing said second set of playing cards in the center of the players, face up;
    rolling of said function indicator by the players and from the numbers indicated determining the player sequence;
    rolling of said function indicator by a first player to turn up either one of said game playing instruction or one of said mathematical function, and if an instruction is presented the player follows the instruction indicated and then passes said function indicator to a second player in rotation, whereas if one of said mathematical functions comes up, said first player takes a face up card of said second set and places it face up with the number showing;
    consideration by said second player of the shown mathematical function, the face up card of said second set, and the card placed face up by said player, and playing a maximum of two cards from his hand that provide the correct answer to the problem determined by the combination of said face up card of said second set, said face up card of said player, and said mathematical function to be utilized;
    passing by said second next player to a third player after playing cards to provide said correct answer or if said correct answer cannot be provided; and
    subsequent players so combining said face up card of said second set, said face up card of a player, and said mathematical function to be utilized until a player's hand is rid of all cards.

11. The method of claim 10 wherein said mathematical functions are taken from the group consisting of addition, subtraction, multiplication and division.

12. The method of claim 11 wherein said function indicator is six-sided and taken from the group consisting of a die and a longitudinally elongated hexagonal bar.

* * * * *